(12) United States Patent
Fujita et al.

(10) Patent No.: US 10,719,391 B2
(45) Date of Patent: Jul. 21, 2020

(54) STORAGE SYSTEM AND STORAGE CONTROL APPARATUS

(71) Applicant: HITACHI, LTD., Tokyo (JP)

(72) Inventors: Kotoko Fujita, Tokyo (JP); Masanori Fujii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/329,327

(22) PCT Filed: Apr. 28, 2017

(86) PCT No.: PCT/JP2017/017008
§ 371 (c)(1),
(2) Date: Feb. 28, 2019

(87) PCT Pub. No.: WO2018/198336
PCT Pub. Date: Nov. 1, 2018

(65) Prior Publication Data
US 2019/0250982 A1    Aug. 15, 2019

(51) Int. Cl.
*G06F 11/00*    (2006.01)
*G06F 11/10*    (2006.01)
(Continued)

(52) U.S. Cl.
CPC .......... *G06F 11/1004* (2013.01); *G06F 3/06* (2013.01); *G06F 3/0619* (2013.01);
(Continued)

(58) Field of Classification Search
None
See application file for complete search history.

(56) References Cited

U.S. PATENT DOCUMENTS

| | | | |
|---|---|---|---|
| 9,081,669 B2 * | 7/2015 | Tadepalli | G06F 12/0246 |
| 2004/0010612 A1 * | 1/2004 | Pandya | H04L 29/06 709/230 |

(Continued)

FOREIGN PATENT DOCUMENTS

| | | |
|---|---|---|
| JP | 2009-157757 A | 7/2009 |
| JP | 2011-101249 A | 5/2011 |

(Continued)

OTHER PUBLICATIONS

R. Lachaize and J. S. Hansen, "A distributed shared buffer space for data-intensive applications," CCGrid 2005. IEEE International Symposium on Cluster Computing and the Grid, 2005., Cardiff, Wales, UK, 2005, pp. 913-920 vol. 2, (Year: 2006).*

*Primary Examiner* — Daniel F. McMahon
(74) *Attorney, Agent, or Firm* — Volpe and Koenig, P.C.

(57) ABSTRACT

Provided is a storage system that includes a first cluster and a second cluster and that controls a storage device. The first cluster has a first processor and a first memory, and the second cluster has a second processor and a second memory. The second processor includes an error check module for verifying a DMA controller and a guarantee code. The first cluster adds the guarantee code to write data and stores the same in the first memory. The second cluster activates the DMA controller, reads the write data and the guarantee code from the first memory, causes the error check module to verify the guarantee code, and then stores the same in the second memory.

10 Claims, 11 Drawing Sheets

(51) Int. Cl.
*G06F 3/06* (2006.01)
*G06F 13/28* (2006.01)
*G06F 13/16* (2006.01)

(52) U.S. Cl.
CPC .......... *G06F 3/0644* (2013.01); *G06F 3/0673* (2013.01); *G06F 13/1668* (2013.01); *G06F 13/28* (2013.01)

(56) References Cited

U.S. PATENT DOCUMENTS

| | | | |
|---|---|---|---|
| 2004/0076101 A1* | 4/2004 | Suh | G11B 7/004 369/59.25 |
| 2006/0085570 A1* | 4/2006 | Hosoya | G06F 3/061 710/22 |
| 2009/0080439 A1* | 3/2009 | Wong | G06F 15/17356 370/400 |
| 2009/0168784 A1 | 7/2009 | Nakamura et al. | |
| 2010/0250824 A1* | 9/2010 | Belay | G06F 9/45558 711/6 |
| 2011/0154165 A1 | 6/2011 | Primadani et al. | |
| 2011/0167189 A1* | 7/2011 | Matsubara | G06F 3/0611 710/308 |
| 2015/0370713 A1 | 12/2015 | Morishita et al. | |

FOREIGN PATENT DOCUMENTS

| | | |
|---|---|---|
| JP | 5386593 B2 | 1/2014 |
| WO | 2015/052798 A1 | 4/2015 |

\* cited by examiner 53-1 ADDRESS CONVERSION TABLE

| USER DATA AREA | | MEMORY ADDRESS RANGE OF CLUSTER 1 AS VIEWED FROM CLUSTER 2 | MEMORY ADDRESS RANGE OF CLUSTER 1 AS VIEWED FROM CLUSTER 1 |
|---|---|---|---|
| CLUSTER1 | PATH-1 AREA | 0xAAAA_AAAA ~ 0xBBBB_BBBB | 0xIIII_IIII ~ 0xJJJJ_JJJJ |
| | PATH-2 AREA | 0xCCCC_CCCC ~ 0xDDDD_DDDD | 0xKKKK_KKKK ~ 0xLLLL_LLLL |

53-2 ADDRESS CONVERSION TABLE

| USER DATA AREA | | MEMORY ADDRESS RANGE OF CLUSTER 2 AS VIEWED FROM CLUSTER 1 | MEMORY ADDRESS RANGE OF CLUSTER 2 AS VIEWED FROM CLUSTER 2 |
|---|---|---|---|
| CLUSTER2 | PATH-1 AREA | 0xEEEE_EEEE ~ 0xFFFF_FFFF | 0xMMMM_MMMM ~ 0xNNNN_NNNN |
| | PATH-2 AREA | 0GGGG_GGGG ~ 0xHHHH_HHHH | 0x0000_0000 ~ 0xPPPP_PPPP |

531 534 535

*Fig. 9B*

STORAGE SYSTEM AND STORAGE CONTROL APPARATUS

BACKGROUND

This invention relates to a redundant storage system configured to add a guarantee code to write data to store the write data.

In a storage system, a redundant configuration of duplexing a controller is employed to improve fault tolerance. In the storage system having the redundant configuration, write data received by a primary controller is transferred to a secondary controller, and both the controllers write pieces of data to respective drives.

There is known a technology of adding a guarantee code (error check code) to data transferred from the primary controller to the secondary controller in order to guarantee consistency of the data in the above-mentioned storage system having the redundant configuration (for example, JP 5386593 B2).

In JP 5386593 B2, a processor of the primary controller adds a guarantee code to write data received from the host, and transmits the write data and the guarantee code to the secondary controller. A processor of the secondary controller acquires the guarantee code, and verifies the consistency of the transferred data.

As the guarantee code, there are known, for example, an LA/LRC, which combines a longitudinal redundancy check (LRC) for detecting a bit error and a logical address (LA) for detecting an error in address with each other.

SUMMARY

However, the guarantee code is verified through calculation by the processor in the secondary controller in the related-art example, and a time required for software processing and a wait time until a computer resource is secured are required.

In other words, in the related-art storage system having the redundant configuration, the wait time from a time point at which the secondary controller assigns a processor or a processor core to the processing of verifying the guarantee code to a time point at which the processing actually starts and the time during which the processor actually executes the processing are added to a response time of the storage system.

Therefore, in the related-art example, there is a problem in that it is difficult to reduce the response time during which the primary controller receives write data from the host, and then transfers the data to the secondary controller, the secondary controller, in turn, verifies the consistency of the data, and then notifies the primary controller of the completion of the verification, and the primary controller finally transmits a completion notification to the host. Therefore, it is an object of this invention to provide a storage system having a redundant configuration and being configured to add a guarantee code to reduce a processing time for verifying the guarantee code and a wait time for securing a computer resource.

An aspect of this disclosure is a storage system including a storage apparatus includes a storage medium, a first cluster and a second cluster. The storage system is configured to control the storage apparatus. The first cluster and the second cluster are coupled to each other through a path. The first cluster includes a first processor and a first memory. The second cluster includes a second processor and a second memory. The second processor includes a DMA controller configured to transfer write data stored in the first memory to the second memory through the path and an error check module configured to verify a certification code added to the write data. The first cluster is configured to, when receiving write data directed to the storage apparatus, generate a guarantee code for the write data, add the guarantee code to the write data, store the write data and the guarantee code in a predetermined area of the first memory, and request the second cluster for DMA transfer. The second is being configured to activate the DMA controller based on the request for the DMA transfer, reads the write data and the guarantee code from the first memory. The second is being configured to control the error check module to verify the guarantee code, and store the write data for which the verification is completed in the second memory.

According to one embodiment of this invention, the processing time for the verification can be reduced, and the wait time for securing the computer resource for the verification processing can be suppressed to increase performance of the storage system compared with the related-art example by causing the error check module of the second cluster to execute the verification processing for the guarantee code.

BRIEF DESCRIPTION OF THE DRAWINGS

FIG. 9A is a table for showing an example of the address conversion table of the cluster 1 according to this embodiment of this invention.

FIG. 9B is a table for showing an example of the address conversion table of the cluster 2 according to this embodiment of this invention.

DETAILED DESCRIPTION OF THE PREFERRED EMBODIMENTS

A description is now given of an embodiment of this invention with reference to the accompanying drawings.

<System Configuration>

Figure 1:
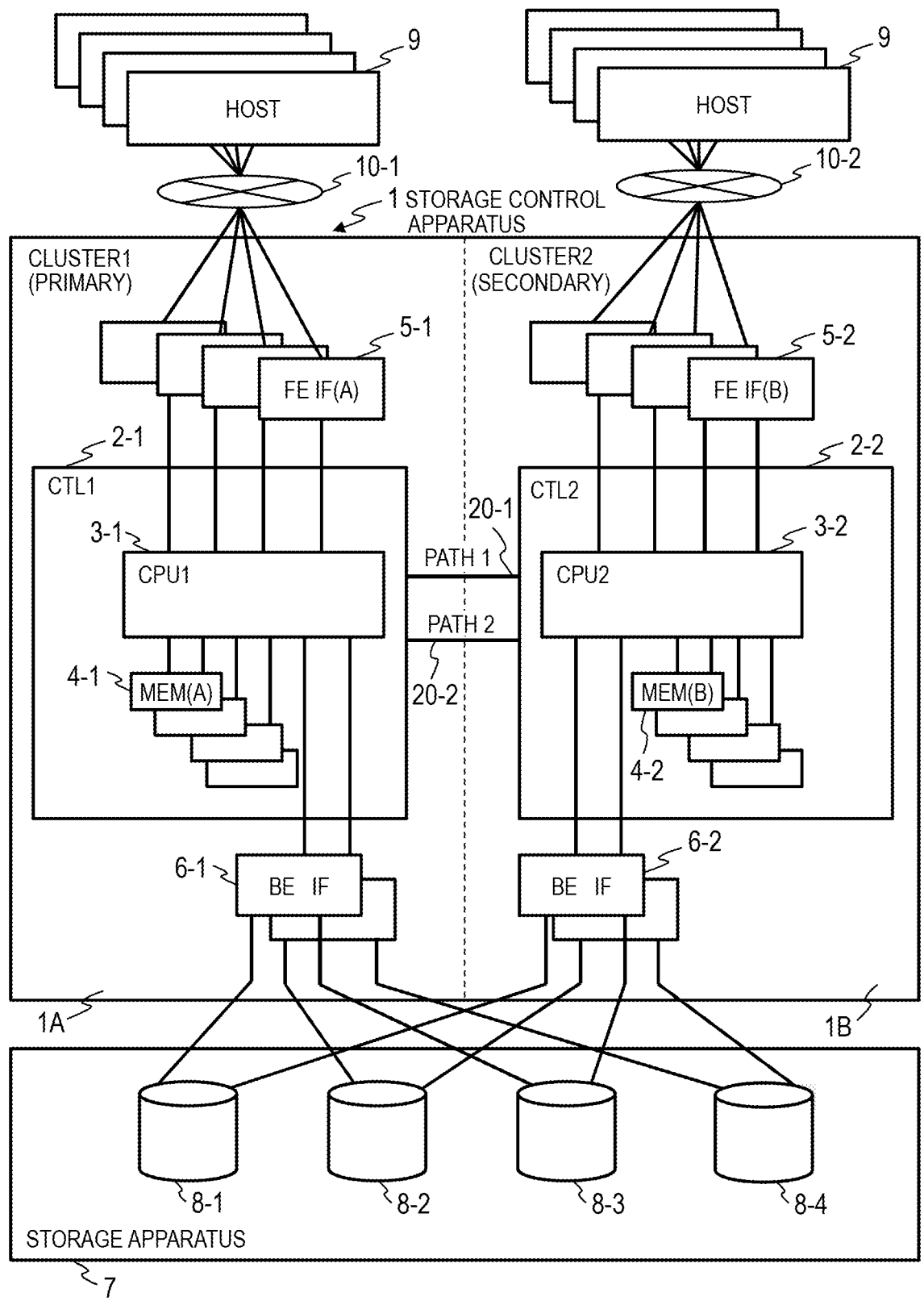
FIG. 1 is a block diagram for illustrating an example of a storage system according to an embodiment of this invention.

FIG. 1 is a block diagram for illustrating an example of a storage system according to the embodiment of this invention. The storage system includes a storage control apparatus 1, and networks 10-1 and 10-2. The storage control apparatus 1 is configured to control a storage apparatus 7 including a plurality of drives 8-1 to 8-4. The networks 10-1 and 10-2 are configured to couple a plurality of hosts 9 and the storage control apparatus 1 to each other.

The storage control apparatus 1 has a redundant configuration including a cluster 1 (1A) and a cluster 2 (1B) operating independently of each other. In the illustrated example, the cluster 1 (1A) functions as a primary cluster, and the cluster 2 (1B) functions as a secondary cluster.

The cluster 1 (1A) includes front-end interfaces 5-1 (FE_IFs (A) of FIG. 1) coupled to the network 10-1, a control module 2-1 (CTL1 of FIG. 1), and back-end interfaces 6-1 (BE_IFs of FIG. 1) coupled to the storage apparatus 7.

The cluster 2 (1B) has a similar configuration, and includes front-end interfaces 5-2 (FE_IFs (B) of FIG. 1) coupled to the network 10-2, a control module 2-2 (CTL2 of FIG. 1), and back-end interfaces 6-2 (BE_IFs of FIG. 1) coupled to the storage apparatus 7.

The networks 10-1 and 10-2 can be formed of, for example, Fibre Channel (FC). Moreover, in this embodiment, although a description is given of an example in which the cluster 1 (1A) and the cluster 2 (1B) are respectively coupled to the networks 10-1 and 10-2 different from each other, the configuration is not limited to this example, and the cluster 1 (1A) and the cluster 2 (1B) may be coupled to the same network.

In the following description, "-1" is added to a reference numeral of a component of the cluster 1 (1A), and "-2" is added to a reference numeral of a component of the cluster 2 (1B). However, "-" and its subsequent numeral are omitted for a description of components of the same type.

The front-end interfaces 5-1 of the cluster 1 (1A) are formed of at least one front-end interface, and are configured to execute protocol conversion and predetermined processing between the network 10 and the control module 2-1. In this embodiment, as the predetermined processing to be executed by the front-end interface 5, a description is given of an example in which a guarantee code for write data is calculated, and the guarantee code is added to the data. As the guarantee code, such a widely-known or publicly-known technology as the above-mentioned LA/LRC may be applied.

The control module 2-1 includes a CPU 3-1 and a memory 4-1 (Mem (A) in FIG. 1). The CPU 3-1 is configured to execute calculation processing. The memory 4-1 is configured to store programs and data. The control module 2-1 is coupled to a control module 2-2 of the cluster 2 (1B) through a path 1 (20-1) and a path 2 (20-2).

The control module 2-1 is configured to access the storage apparatus 7 through the back-end interfaces 6-1. The back-end interface 6-1 is configured to execute protocol conversion and the like between the storage apparatus 7 and the control module 2-1. As a protocol of the storage apparatus 7, for example, the serial attached SCSI (SAS) or the like can be employed.

The cluster 2 (1B) is also configured similarly to the cluster 1 (1A), and includes front-end interfaces 5-2, a control module 2-2, and back-end interfaces 6-2. The respective components are the same as those of the cluster 1 (1A), and a duplicate description thereof is therefore omitted.

The storage apparatus 7 includes the plurality of drives 8-1 to 8-4, and is configured to read/write data in accordance with a request from the storage control apparatus 1. The drive 8 is formed of a nonvolatile storage device such as a hard disk drive or a solid state drive (SSD).

<Details of Control Modules>

Figure 2:
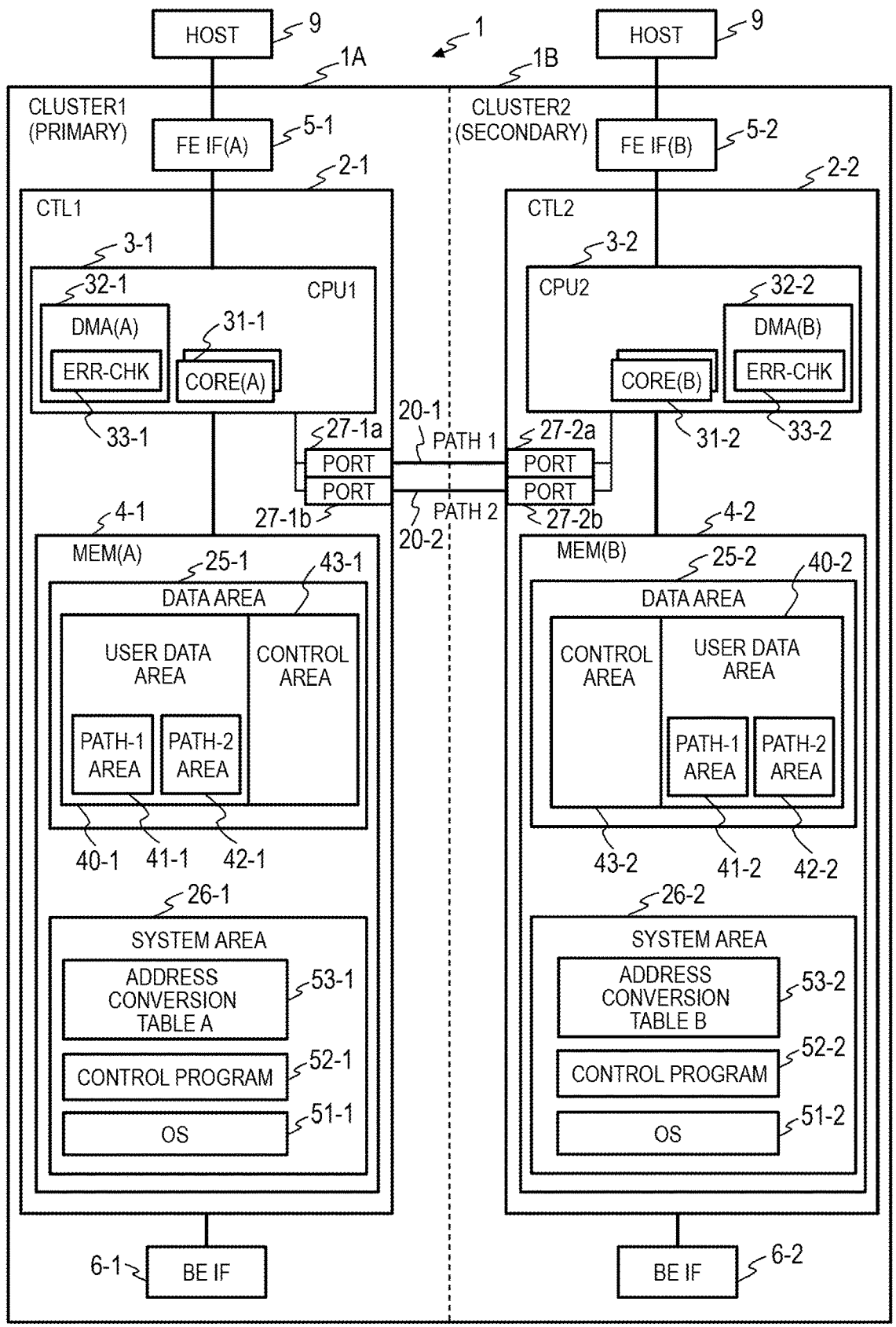
FIG. 2 is a block diagram for illustrating an example of the control modules of the storage control apparatus according to the embodiment of this invention.

FIG. 2 is a block diagram for illustrating an example of the control modules of the storage control apparatus 1 according to this embodiment of this invention. The cluster 1 (1A, omitted in the following) and the cluster 2 (1B, omitted in the following) forming the storage control apparatus 1 operate as computers independent of each other. The control module 2-1 and the control module 2-2 are coupled to each other through the path 1 (20-1, omitted in the following) and the path 2 (20-2, omitted in the following).

The control modules 2-1 and 2-2 have similar configurations, and thus, a description is now given of the control module 2-1.

The control module 2-1 includes a CPU 1 (3-1), a memory 4-1, and ports 27-1a and 27-1b. The CPU 1 (3-1) is formed of a multi-core processor. The ports 27-1a and 27-1b are coupled to the control module 2-2 of the cluster 2.

The CPU 1 (3-1) includes a plurality of processor cores 31-1 (Cores (A) of FIG. 2), and a direct memory access (DMA) controller 32-1 (DMA (A) of FIG. 2). The CPU 1 (3-1) is coupled to a CPU 2 (3-2) through the path 1 and the path 2.

The PCI Express ports 27-1a and 27-1b are provided in the control module 2-1, and are coupled to the CPU 1 (3-1). The ports 27-1a and 27-1b are coupled to a non-transparent bridge (NTB) of the CPU 1 (3-1).

The port 27-1a of the cluster 1 is coupled to a port 27-2a of the cluster 2, to thereby form the path 1. The port 27-1b of the cluster 1 is coupled to a port 27-2b of the cluster 2, to thereby form the path 2. The portion between the ports 27 of the cluster 1 and the cluster 2 is formed of, for example, a backplane (not shown) or the like.

In this embodiment, there is given an example in which the CPUs 3 and the paths 1 and 2 are coupled to each other through the NTB, but the coupling is not limited to the NTB as long as the CPU 2 of the own cluster 1 can access a predetermined area of the memory 4 of the other cluster 2 having a redundant configuration.

The DMA controller 32-1 is configured to execute processing of reading data from a predetermined area of the memory 4 of the other cluster having a redundant configuration, and writing the data in a predetermined area of the memory 4 of the own cluster. Moreover, the DMA controller 32-1 includes an error check module 33-1 configured to verify the guarantee code, and is configured to verify a guarantee code added to data.

The DMA controller 32-1 is configured to transfer data in a predetermined area of the memory 4-2 (Mem (B) of FIG. 2) of the other cluster 2 having a redundant configuration to a predetermined area of the memory 4-1 of the own cluster 1.

On the other hand, the DMA controller 32-2 of the cluster 2 is configured to transfer data by reading the data from a predetermined area of the memory 4-1 of the cluster 1, and write the data in a predetermined area of the memory 4-2 of the own cluster.

The DMA controller 32 in this embodiment includes the error check module 33, and can verify the guarantee code added to the transferred data. As a result, in a case where the data to be written to the cluster 1 is redundantly configured, and the guarantee code is added to the write data, when the cluster 2 serving as the transfer destination verifies the guarantee code, the processing can be executed by the error check module 33 without using the processor core 31-2 of the CPU 2 (3-2).

Thus, the period of the verification processing can be reduced through the hardware processing by the error check module 33 compared with the verification processing for the guarantee code through the software processing by the processor core 31-2.

Further, although a wait time for securing the processor core 31-2 is required in the software processing by the processor core 31-2, the wait time for securing the computer resource for the software processing is eliminated through the hardware processing by the error check module 33.

Moreover, in this embodiment, the read processing through the paths 1 and 2 configured to couple the redundantly configured clusters 1 and 2 to each other is set as unidirectional, thereby avoiding deadlock described later. In this embodiment, when the DMA controller 32-1 of the cluster 1 reads the data in the memory 4-2 of the cluster 2, the path 1 is used. When the DMA controller 32-2 of the cluster 2 reads the data in the memory 4-1 of the cluster 1, the path 2 is used.

The memory 4-1 includes a data area 25-1 and a system area 26-1. An OS 51-1, a control program 52-1, and an address conversion table 53-1 are loaded to the system area 26-1. The OS 51-1 and the control program 52-1 are executed by any one of the plurality of processor cores 31-1. The address conversion table 53-1 is referred to by the control program 52-1.

The data area 25-1 includes a control area 43-1 and a user data area 40-1. The control area 43-1 holds control information. The user data area 40-1 holds data.

The control information on the processor cores 31-1 and 31-2, the DMA controllers 32-1 and 32-2, the host 9, and the like are written in the control area 43-1. The processor cores 31-1 and 31-2 can mutually execute writing to the control areas 43-1 and 43-2 between the clusters 1 and 2. When the processor core 31 executes the writing to the other control area 43 in the redundant configuration, the processor core 31 may use any one of the paths 1 and 2, or a control path (not shown) may be provided.

Data transferred from the host 9, data transferred from the storage apparatus 7, and the like are stored in the user data area 40-1. The user data area 40-1 includes a path-1 area 41-1 and a path-2 area 42-1.

The path-1 area 41-1 is an area that can be used to access the control module 2 of the other cluster having a redundant configuration through the path 1. For example, data read from a path-1 area 41-2 of the memory 4-2 of the cluster 2 through the path 1 can be stored in the path-1 area 41-1.

The path-2 area 42-1 is an area that the control module 2 of the other cluster having a redundant configuration can access through the path 2. For example, data transferred to a path-2 area 42-2 of the memory 4-2 of the cluster 2 through the path 2 can be stored in the path-2 area 42-1.

The user data area 40-2 of the memory 4-2 of the cluster 2 is formed of the path-1 area 41-2 and the path-2 area 42-2. The path-1 area 41-2 stores data to be transferred to the cluster 1. The path-2 area 42-2 stores data read from the cluster 1.

The address conversion table 53-1 of the cluster 1 and the address conversion table 53-2 of the cluster 2 are different from each other in content. The address conversion tables 53-1 and 53-2 are information set in advance.

The address conversion table 53-1 defines such a configuration that the cluster 1 accesses different memory areas of the cluster 2 through the path 1 and the path 2, respectively. Similarly, the address conversion table 53-1 defines such a configuration that the cluster 2 accesses different memory areas of the cluster 1 through the path 1 and the path 2, respectively.

FIG. 9A is a table for showing an example of the address conversion table 53-1 of the cluster 1. The address conversion table 53-1 includes, as one entry, a user data area 531 for storing the path-1 area and the path-2 area, a memory address range 532 of the cluster 1 viewed from the cluster 2, and a memory address range 533 of the cluster 1 viewed from the cluster 1.

FIG. 9B is a table for showing an example of the address conversion table 53-2 of the cluster 2. The address conversion table 53-2 includes. as one entry, the user data area 531 for storing the path-1 area and the path-2 area, a memory address range 534 of the cluster 2 viewed from cluster 1, and a memory address range 535 of the cluster 2 viewed from the cluster 2.

<Overview of Processing>

Figure 3:
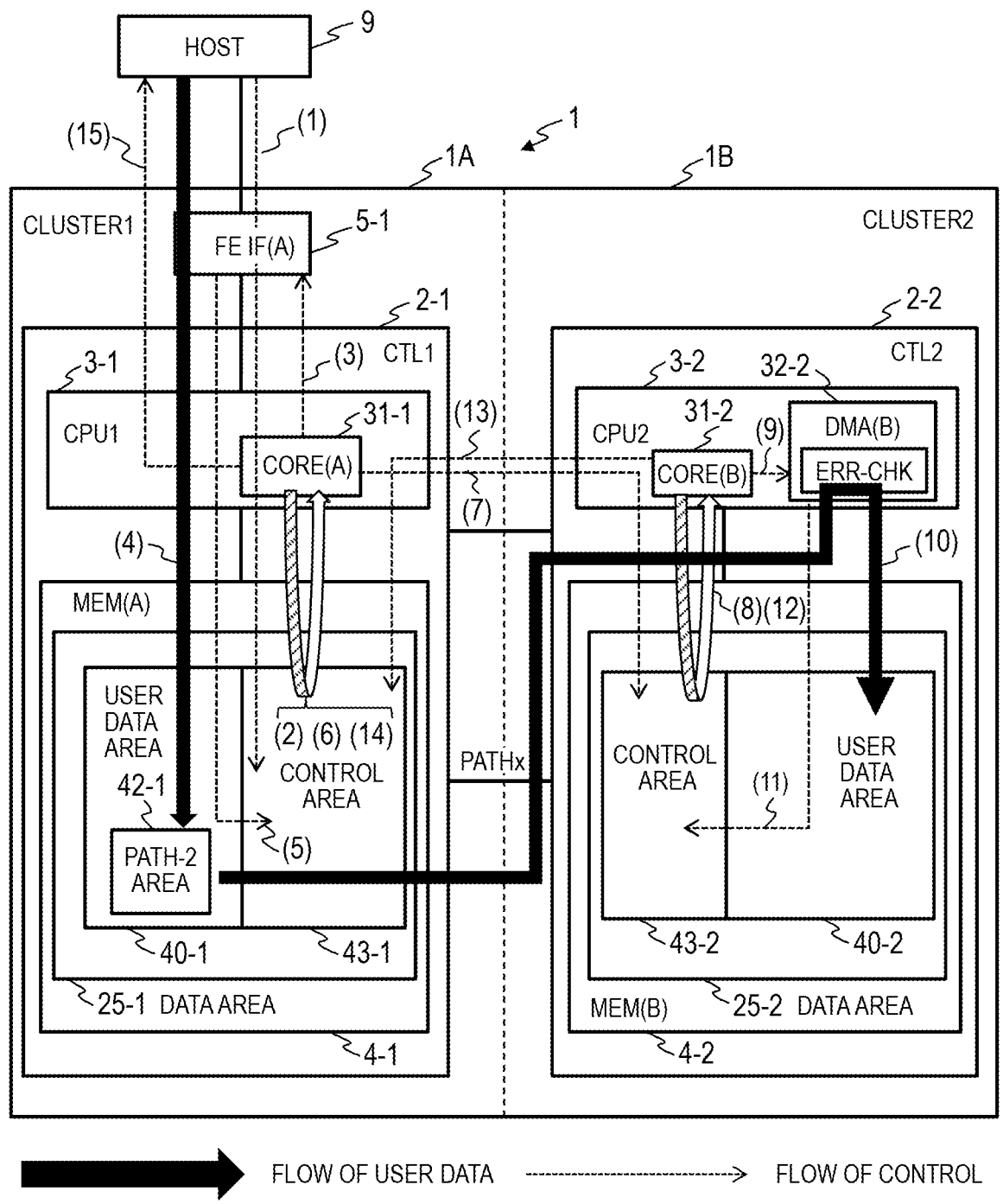
FIG. 3 is a diagram for illustrating an example of write processing executed in the storage system according to the embodiment of this invention.
Figure 4:
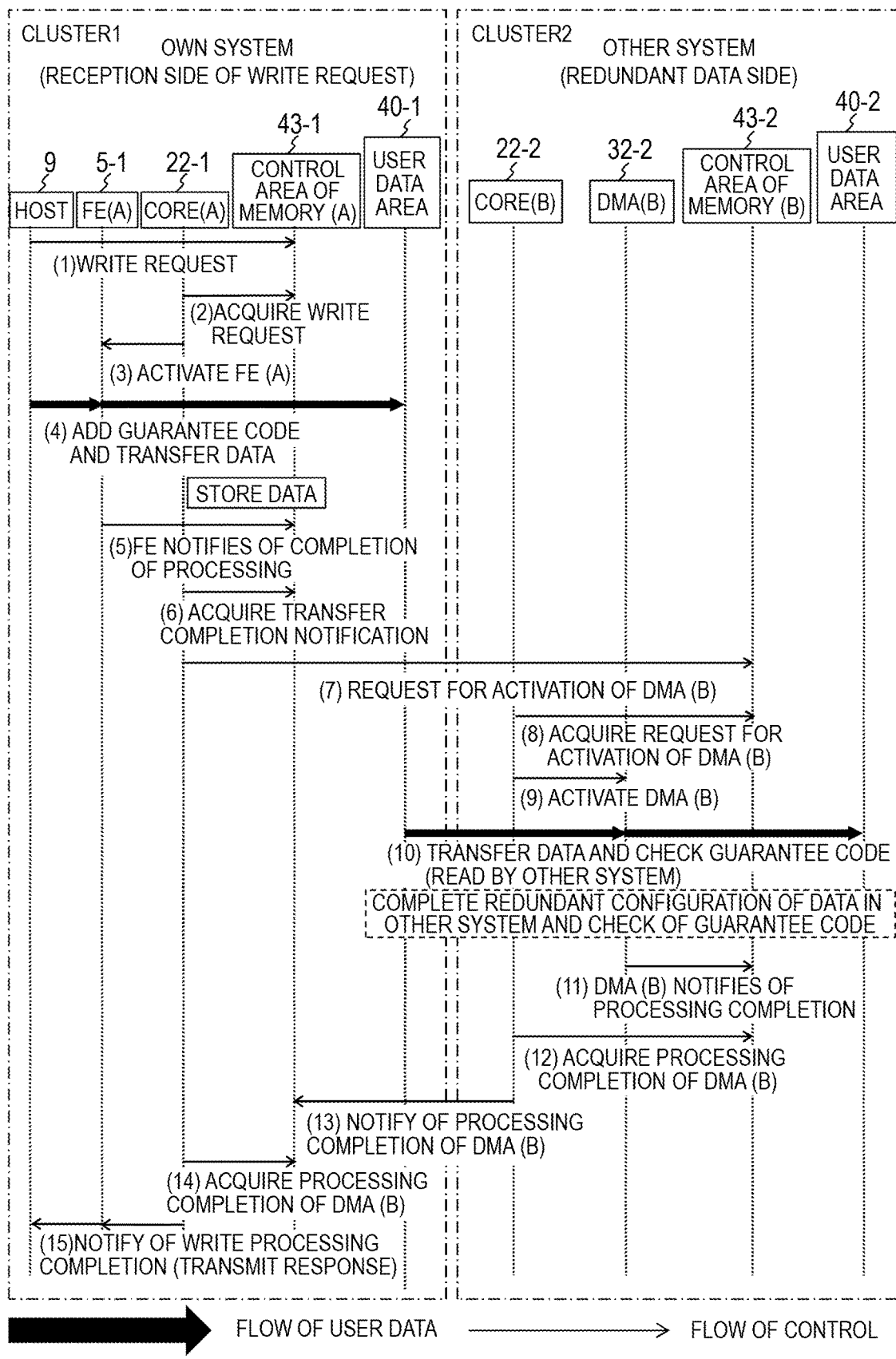
FIG. 4 is a sequence diagram for illustrating the example of the write processing executed in the storage system according to one embodiment of this invention.

FIG. 3 is a diagram for illustrating an example of write processing executed in the storage system according to one embodiment of this invention. FIG. 4 is a sequence diagram for illustrating the example of the write processing executed in the storage system according to one embodiment of this invention. The illustrated processing is processing executed when the cluster 1 receives a write request from the host 9. The write processing is executed through procedures (1) to (15) illustrated in FIG. 3 and FIG. 4.

(1) The host 9 requests a write, and writes a write command in the control area 43-1 of the memory 4-1 of the cluster 1.

(2) The control program 52-1 operating in the processor core 31-1 (hereinafter referred to as processor core A) of the cluster 1 acquires the write command from the control area 43-1 of the memory 4-1.

(3) The control program 52-1 operating in the processor core A determines whether the cluster in which the processor core A itself is operating is primary or secondary, and activates the front-end interface 5-1. The path and the area of the memory 4-1 used for the transfer of data to be redundantly configured are determined in accordance with the determination result, and the front-end interface 5-1 is then activated. In the illustrated example, the control program 52-1 operates in the cluster 1, and uses the path 2 and the path-2 area 42-1.

(4) The front-end interface 5-1 receives the write data from the host 9, generates a guarantee code for the data, adds the guarantee code to the write data, and stores the data and the guarantee code in the path-2 area 42-1 of the user data area 40-1. The write data stored in the user data area 40-1 is written from the back-end interface 6-1 to the storage apparatus 7 at a predetermined timing.

(5) The front-end interface 5-1 writes a transfer completion notification for the write data from the host 9 in the control area 43-1 of the memory 4-1.

(6) The control program 52-1 operating in the processor core A reads data in the control area 43-1 of the memory 4-1, to thereby acquire the transfer completion notification of the front-end interface 5-1.

(7) The control program 52-1 operating in the processor core A writes an address of the path-2 area 42-1 at which the write data is stored, and an activation request for the DMA controller 32-2 (hereinafter referred to as DMA (B)) to the control area 43-2 of the memory 4-2 of the cluster 2.

(8) A control program 52-2 operating in the processor core 31-2 (hereinafter referred to as processor core B) of the cluster 2 reads the data in the control area 43-2 of the memory 4-2, to thereby acquire the activation request for the DMA (B).

(9) The control program 52-2 of the cluster 2 sets a read area for the data calculated from the information on the path-2 area 42-1 storing the write data and the path-2 area 42-2 of the user data area 40-2 of the transfer destination to the DMA (B), and activates the DMA (B).

(10) The DMA (B) reads the write data from the path-2 area 42-1 of the memory 4-1 through the path 2, and verifies the guarantee code by the error check module 33 of the DMA (B). When the verification of the guarantee code is completed, the DMA (B) writes the data in the user data area 40-2 of the memory 4-2. The write data written to the user data area 40-2 is written to the storage apparatus 7 through the back-end interface 6-2 at a predetermined timing.

(11) The DMA (B) writes a notification indicating transfer completion of the write data to the control area 43-2 of the memory 4-2.

(12) The control program 52-2 operating in the processor core B reads data from the control area 43-2 of the memory 4-2, to thereby acquire the completion notification of the transfer by the DMA (B).

(13) The control program 52-2 operating in the processor core B writes a completion notification of the processing by the DMA (B) to the control area 43-1 of the memory 4-1 of the cluster 1.

(14) The control program 52-1 operating in the processor core A reads data in the control area 43-1 of the memory 4-1, to thereby acquire the completion notification of the processing by the DMA (B).

(15) The control program 52-1 of the cluster 1 transmits a response indicating write completion to the host 9 through the front-end interface 5-1.

As a result of the above-mentioned processing, the guarantee code is added to the write data received by the cluster 1, the write data and the guarantee code are transferred by the DMA (B) of the cluster 2, and the guarantee code is verified by the error check module 33 of the DMA (B). Then, the redundant data, the content of which is verified by the cluster 1 and the cluster 2, is written to the storage apparatus 7, and the response indicating write completion is transmitted from the cluster 1 to the host 9.

In this embodiment, when the guarantee code is added to the write data, and the guarantee code is verified in the cluster 2, which is the transfer destination, the processing can be executed by the error check module 33 integrated into the DMA (B) without using the processor core B. As a result, compared with the related-art example in which the guarantee code is verified through the software processing, the guarantee code can be verified at a high speed, and the wait time for securing the computer resource can further be eliminated.

Respective functional modules of the storage control apparatus 1 are loaded to the system area 26 of the memory 4 as programs. The CPU 3 operates as the functional modules configured to provide predetermined functions through processing in accordance with the programs of the respective functional modules. For example, the CPU 3 functions as a control module by executing processing in accordance with the control program 52. The same applies to other programs. Further, the CPU 3 also operates as a functional module configured to provide respective functions of a plurality of pieces of processing executed by each program. The computer and the computer system are an apparatus and a system including those functional modules, respectively.

<Details of Processing>

Figure 5:
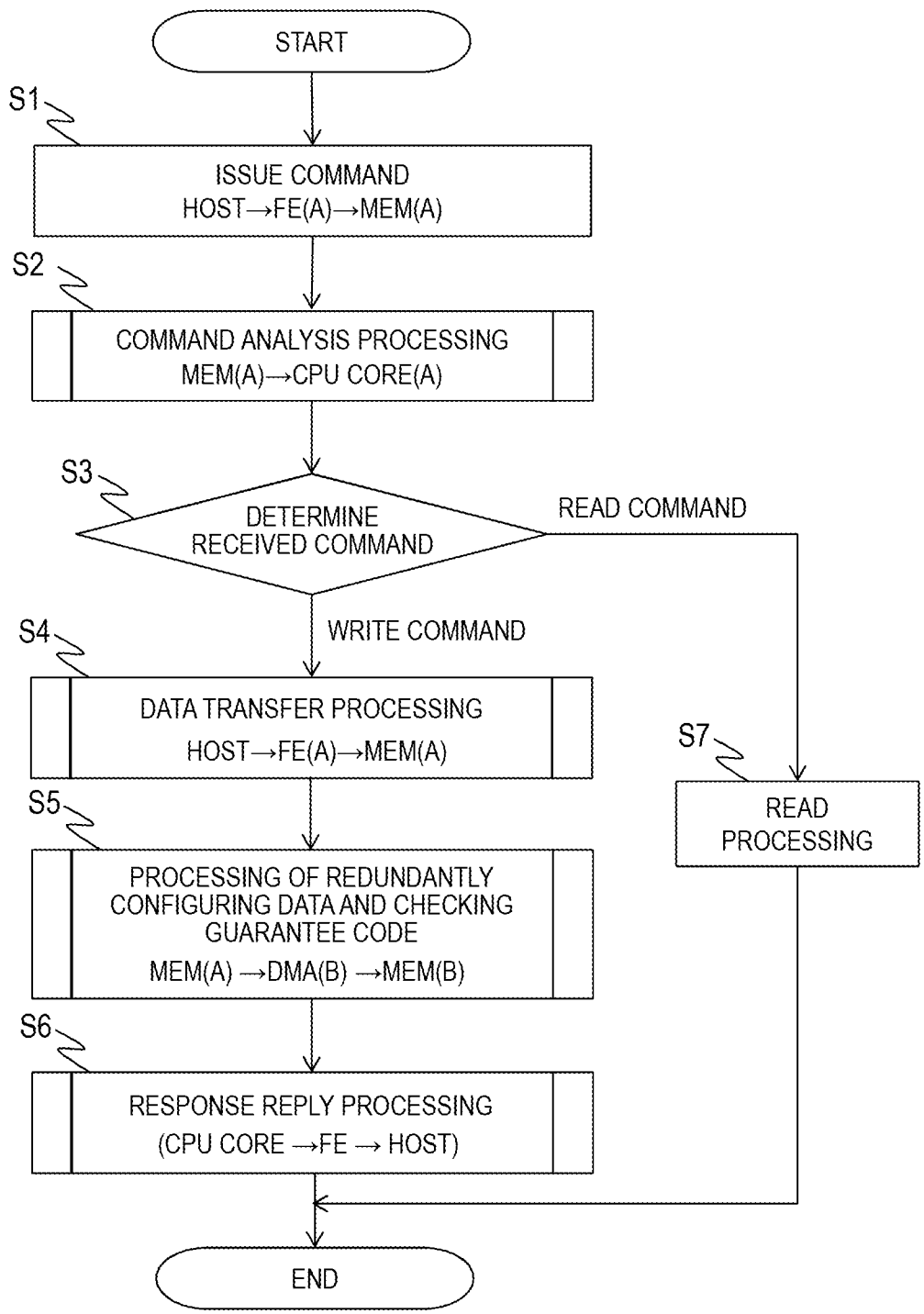
FIG. 5 is a flowchart for illustrating an example of processing executed by the control module of the storage system according to the embodiment of this invention.

FIG. 5 is a flowchart for illustrating an example of processing executed by the control module 2 of the storage system.

In Step S1, the host 9 requests an access to the storage apparatus 7, and a command is written to the control area 43 of the memory 4 of the cluster 1. The control program 52 operating in the processor core 31 acquires the command from the control area 43 of the memory 4.

In Step S2, the control program 52 analyzes the received command. In Step S3, the control program 52 determines whether the received command is a write command or a read command. When the command is a write command, the processing proceeds to Step S4. When the command is a read command, the processing proceeds to Step S7.

In Step S4, the data transfer processing of the procedures (3) to (5) illustrated in FIG. 3 and FIG. 4 is executed. The guarantee code is added to the write data from the host 9, and the write data and the guarantee code are transferred to the user data area 40 of the memory 4.

In Step S5, the processing of redundantly configuring the data and verifying the guarantee code of the procedures (6) to (11) illustrated in FIG. 3 and FIG. 4 are executed. The write data to which the guarantee code is added is transferred by the DMA controller 32 of the other cluster in the redundant configuration, and the data having the verified guarantee code is written to the user data area 40 of the memory 4.

In Step S6, the response reply processing of the procedures (12) to (15) illustrated in FIG. 3 and FIG. 4 is executed. The response indicating write completion is transmitted to the host 9, and the series of the write processing is completed.

In Step S7, processing of reading data from the storage apparatus 7 is executed, and the specified data is transmitted to the host 9. The read processing is the same as that of the above-mentioned related art, and a detailed description thereof is not given.

With the above-mentioned processing, when the cluster 1 of the storage control apparatus 1 receives the write request directed to the storage apparatus 7, the guarantee code is added to the data to be redundantly configured, and the data and the guarantee code are transferred to the cluster 2 by means of the DMA. The DMA controller 32-2 of the cluster 2 executes the writing to the memory 4-2 after the verification of the guarantee code by the integrated error check module 33 is completed, and thus the verification processing can be executed without using the processor core 31-2.

<Data Transfer Processing>

Figure 6:
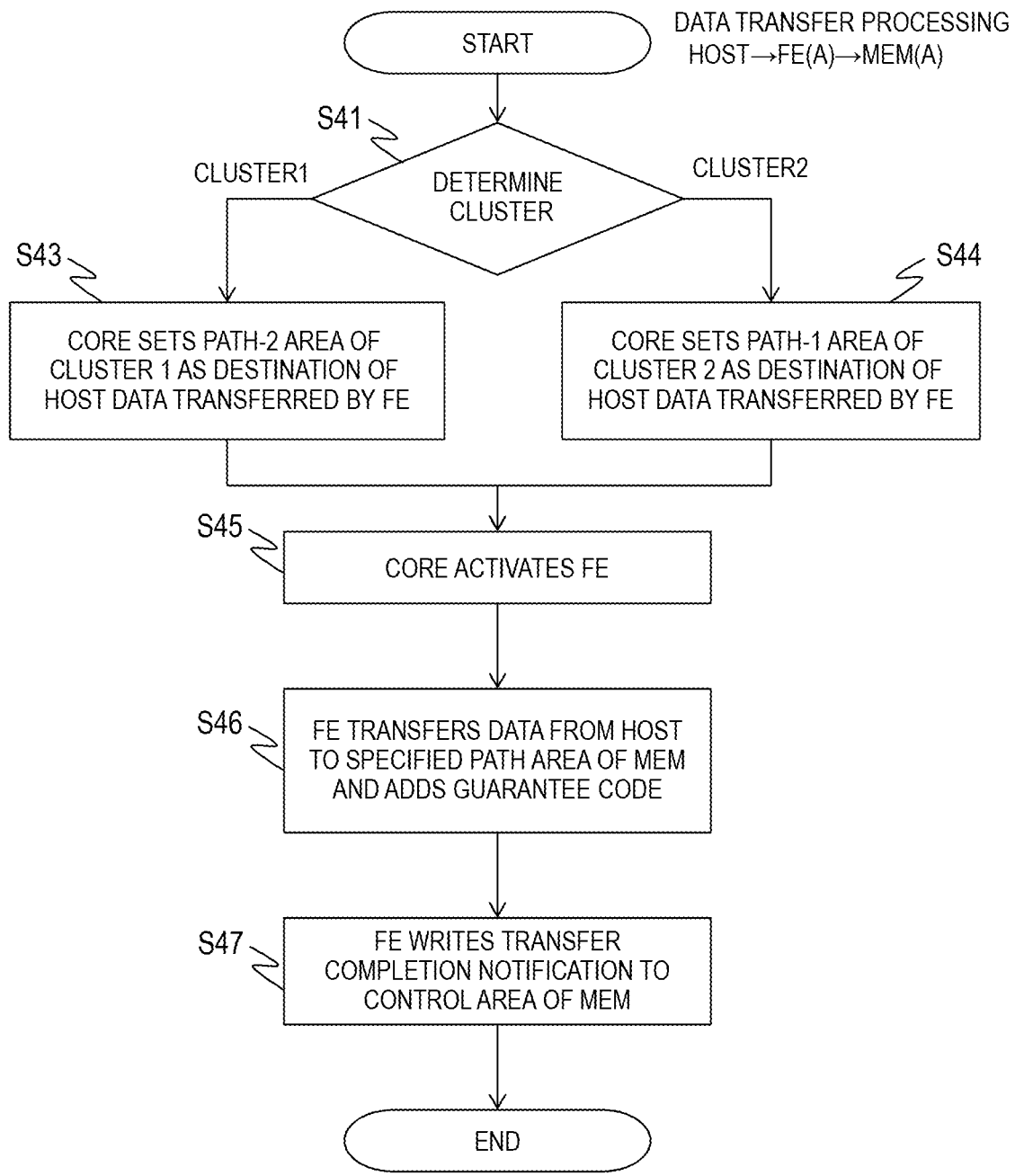
FIG. 6 is a flowchart for illustrating an example of the data transfer processing executed by the storage system according to the embodiment of this invention.

FIG. 6 is a flowchart for illustrating an example of the data transfer processing executed by the storage system. This processing is executed in Step S4 of FIG. 5.

First, in Step S41, the control program 52 operating in the processor core 31 determines whether the cluster in which the control program 52 is operating is the cluster 1 or the cluster 2.

The control program 52 inquires the OS 51 about which cluster is this cluster. When this cluster is the cluster 1, the control program proceeds to Step S43. When this cluster is the cluster 2, the control program proceeds to Step S44. The OS 51 acquires in advance whether the cluster is primary or secondary from information on hardware or the like when the OS 51 starts.

In Step S43, the control program 52 is operating in the cluster 1, and thus the transfer destination of the write data from the host 9 is specified as the path-2 area 42.

On the other hand, in Step S44, when the control program 52 is operating in the cluster 2, the transfer destination of the write data from the host 9 is specified as the path-1 area 41. In Step S45, the processor core 31 executing the control program 52 activates the front-end interface 5.

In Step S46, the front-end interface 5 receives the write data from the host 9, and calculates a guarantee code for this data. Then, the front-end interface 5 writes the write data to which the guarantee code is added to the transfer destination specified in Step S45 or Step S46.

In Step S47, the front-end interface 5 writes, to the control area 43 of the memory 4, the notification that the addition of the guarantee code, and the transfer of the write data have been completed. As described above, the control program 52 writes the write data written to the user data area 40 from the back-end interface 6 to the storage apparatus 7 at the predetermined timing.

With the above processing, when the cluster that receives the write data from the host 9 is the primary cluster 1, "0xKKKK_KKKK to 0xLLLL_LLLL" illustrated in FIG. 9A is specified to the front-end interface 5-1 as the destination address of the write data. The front-end interface 5-1 transfers the write data to which the guarantee code is added to the path-2 area 42-1 of the memory 4-1.

Similarly, when the cluster that receives the write data is the secondary cluster 2, "0xMMMM_MMMM to 0xNNNN_NNNN" illustrated in FIG. 9B is specified to the front-end interface 5-2 as the destination address of the write data. The front-end interface 5-2 transfers the write data to which the guarantee code is added to the path-1 area 41-2 of the memory 4-2.

In the storage control apparatus 1 according to this embodiment, the path for transferring the data to be redundantly configured is determined as any one of the path 1 and the path 2 in accordance with the cluster that receives the write data.

In this embodiment, the example in which the front-end interface 5 calculates and adds the guarantee code for the write data is described, but the configuration is not limited to this example. For example, the guarantee code may be calculated and added by using the resource of the CPU 3.

<Processing of Making Data Redundant and Verifying Guarantee Code>

Figure 7:
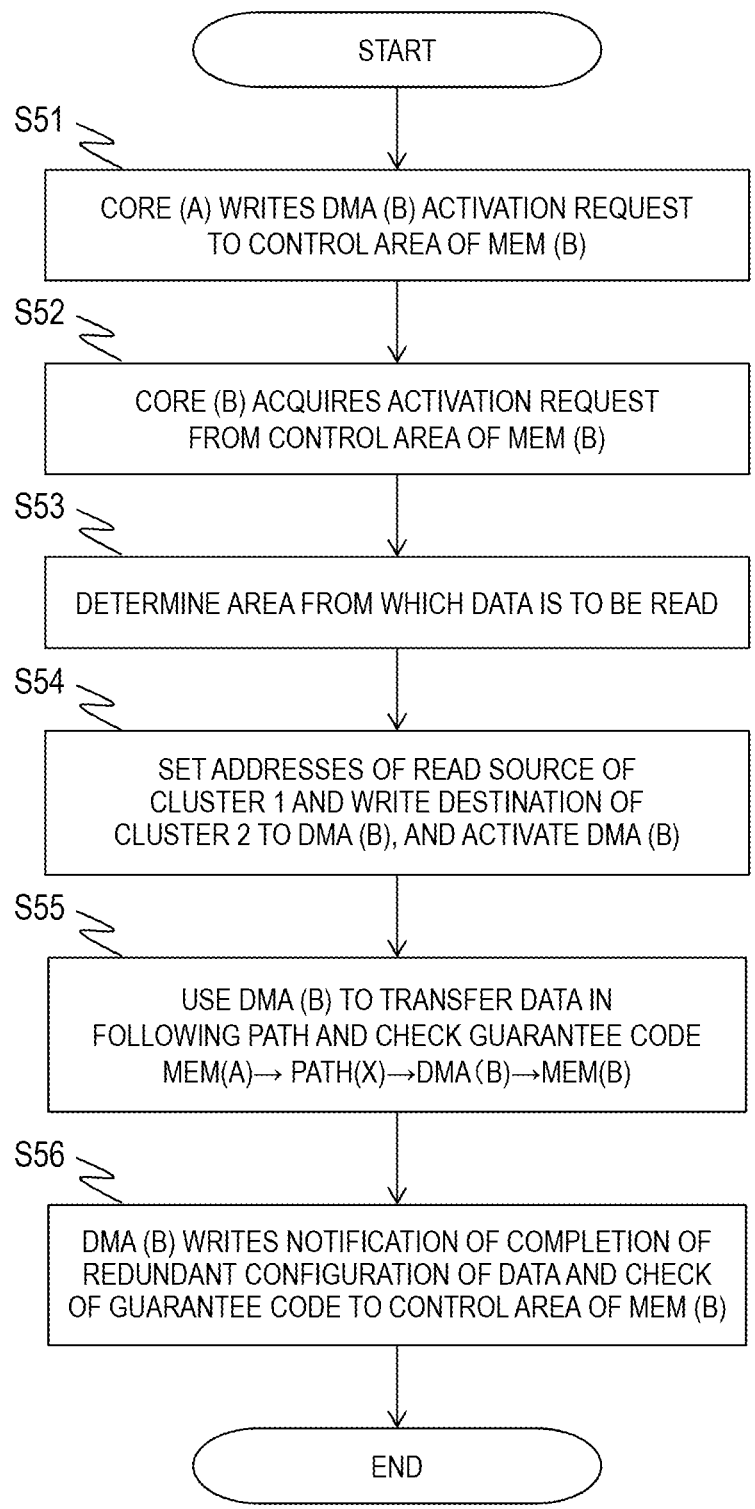
FIG. 7 is a flowchart for illustrating an example of the processing of redundantly configuring the write data and verifying the guarantee code executed in the storage system according to the embodiment of this invention.

FIG. 7 is a flowchart for illustrating an example of the processing of redundantly configuring the write data and verifying the guarantee code executed in the storage system. This processing is executed in Step S5 of FIG. 5. In the following, a description is given of the example in which the write data is received in the cluster 1.

The processor core 31-1 of the cluster 1 reads, from the control area 43-1, the notification that the addition of the guarantee code and the transfer of the write data have been completed, and starts the processing of FIG. 7.

In Step S51, the processor core 31-1 (Core (A) of FIG. 7) writes the activation request for the DMA controller 32-2 (DMA (B) of FIG. 7) to the control area 43-2 of the memory 4-2 (Mem (B) of FIG. 7) of the cluster 2.

The processor core 31-1 also writes transfer information containing the path to be used, the address of the path-2 area 42-1 at which the write data is stored, and the size of the write data in addition to the activation request.

In Step S52, the processor core 31-2 (Core (B) of FIG. 7) executing the control program 52-2 reads the data from the control area 43-2 of the memory 4-2, and acquires the activation request for the DMA (B) and the transfer information.

In Step S53, based on the transfer information acquired by the processor core 31-2, the path to be used, and the address and the size of the area (path-2 area 42-1) from which the write data is read are determined.

The address may be specified through the information on the path, an offset of the address, and a data length. For example, it is assumed that the cluster 1 stores the write data in the path-2 area 42-1, and the path to be used is the path 2, the offset is 0x1000, and the data length is 520. In this case, the processor core 31-1 refers to the address conversion table 53-1, and enables such a setting that the 520 bytes are read from the address of 0xCCCC_CCCC+0x1000 of the path-2 area 42-1 by the DMA controller 32-2.

In Step S54, the processor core 31-2 sets, to the DMA controller 32-2 of the cluster 2, the address of the path-1 area 41-1 of the cluster 1, which is the read source of the data, and an address of the path-2 area 42-2 of the cluster 2, which is a transfer destination of the data, and activates the DMA controller 32-2.

In Step S55, the DMA controller 32-2 reads the write data, to which the guarantee code is added, from the path-2 area 42-1 of the memory 4-1 through the path 2, and verifies the guarantee code by the error check module 33. When the verification is completed, the DMA controller 32-2 writes the data in the path-2 area 42-2 of the user data area 40-2 of the memory 4-2. The write data written to the user data area 40-2 is written to the storage apparatus 7 through the back-end interface 6-2 at the predetermined timing.

In Step S56, the DMA controller 32-2 writes a notification indicating transfer completion of the write data and the verification completion of the guarantee code to the control area 43-2 of the memory 4-2.

With the above-mentioned processing, the guarantee code is verified by the error check module 33 integrated into the DMA controller 32-2 in the cluster 2, and the redundant configuration of the write data is achieved between the cluster 1 and the cluster 2.

<Response Reply Processing>

Figure 8:
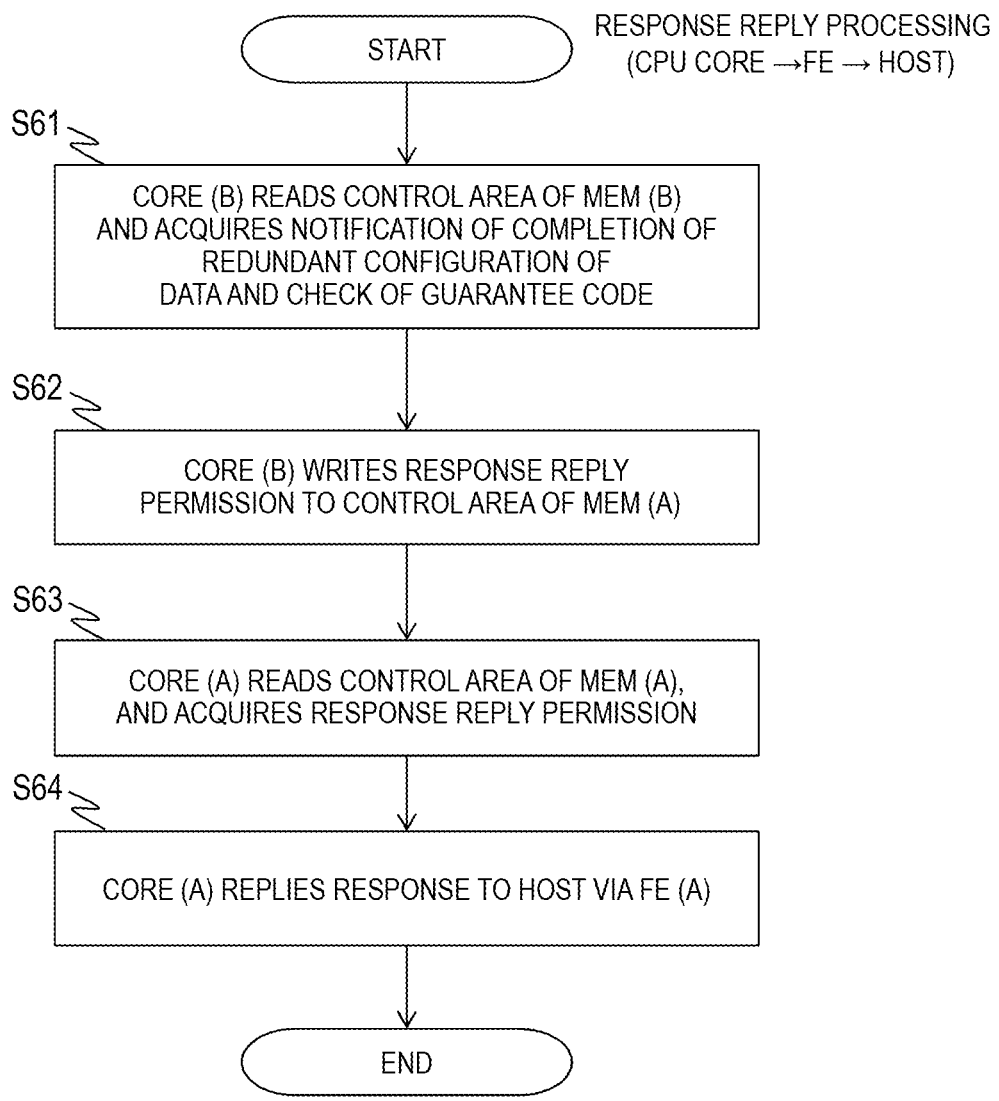
FIG. 8 is a flowchart for illustrating an example of response reply processing executed by the storage system according to the embodiment of this invention.

FIG. 8 is a flowchart for illustrating an example of response reply processing executed by the storage system. This processing is executed in Step S6 of FIG. 5. A description is now given of an example in which data to be redundantly configured is written to the cluster 2.

In Step S61, when the processor core 31-2 (Core (B) of FIG. 8) of the cluster 2 reads the notification indicating transfer completion of the redundant data and the verification completion of the guarantee code from the control area 43-2 of the memory 4-2 (Mem (B) of FIG. 8), the processor core 31-2 executes the following series of processing.

In Step S62, the processor core 31-2 writes a reply permission for a response to the control area 43-1 of the memory 4-1 (Mem (A) of FIG. 8) of the cluster 1.

In Step S63, the processor core 31-1 of the cluster 1 transmits a response indicating write completion to the host 9 through the front-end interface 5-1. With the above processing, when the DMA controller 32-2 of the cluster 2 completes the redundant configuration of the data, the processor core 31-2 writes the notification of the completion of the processing to the control area 43-1 of the memory 4-1, and the processor core 31-1 of the cluster 1 can transmit the response indicating write completion to the host 9.

<Deadlock Avoidance>

Figure 10A:
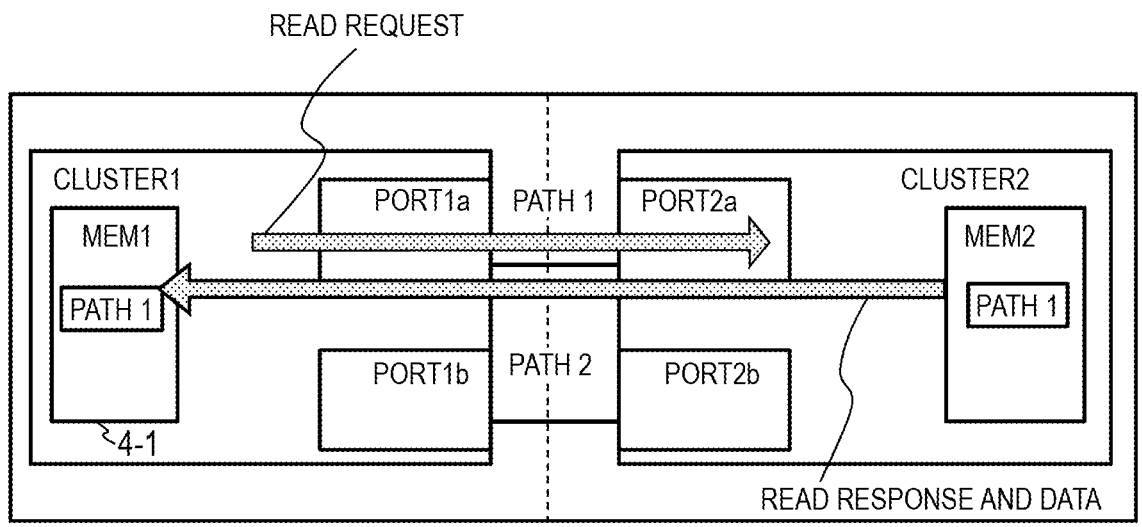
FIG. 10A is a diagram for illustrating details of processing in a case in which data in the cluster 2 is read from the cluster 1 according to the embodiment of this invention.

FIG. 10A is a diagram for illustrating details of processing in a case in which data in the cluster 2 is read from the cluster 1. When the data in the memory 2 of the cluster 2 is read from the cluster 1, the cluster 1 transmits "a read request" to the cluster 2. When the cluster 2 receives "the read request", the cluster 2 reads the data from the memory 2, and transmits "a read response+the data" to the cluster 1.

When the cluster 1 receives "the read response+the data", the cluster 1 stores the data in the memory 1 of the cluster 1. Similar processing is executed also when data in the memory 1 of the cluster 1 is read from the cluster 2.

Figure 10B:
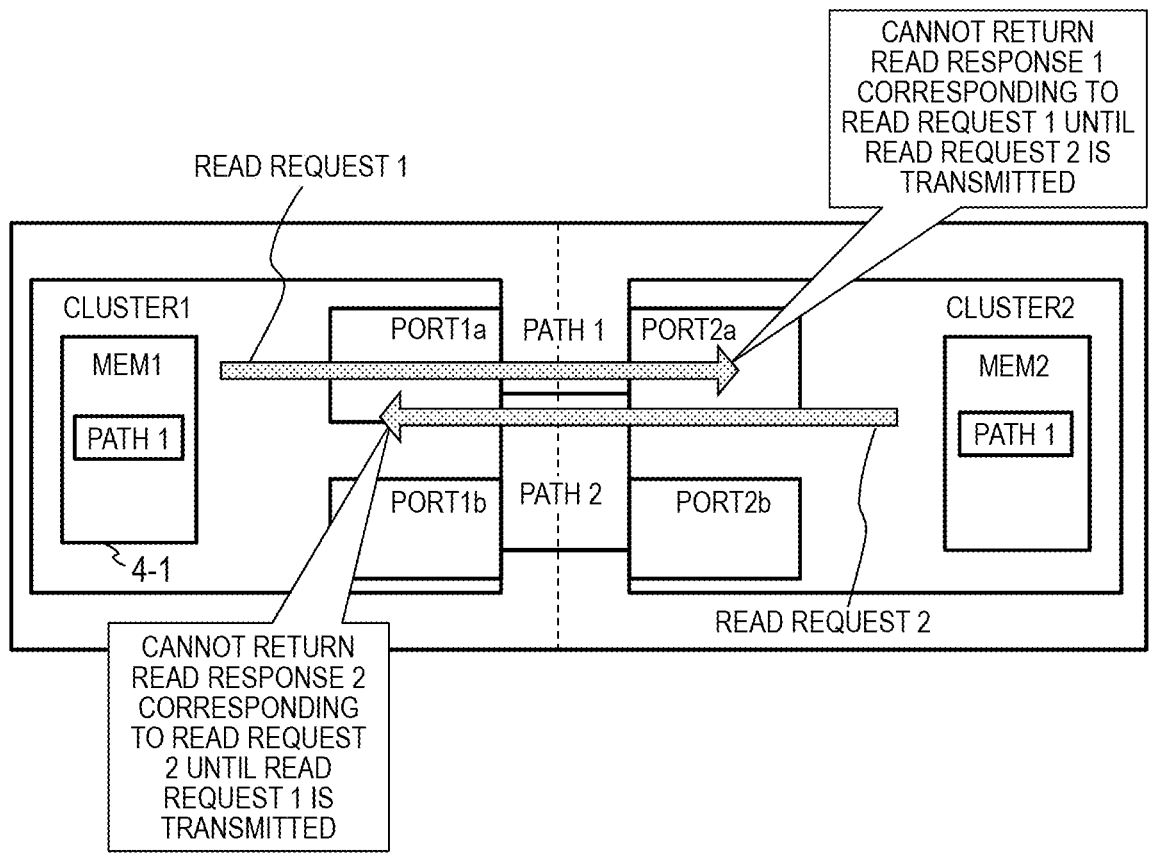
FIG. 10B is a diagram for illustrating an occurrence of a deadlock according to the embodiment of this invention.

FIG. 10B is a diagram for illustrating an occurrence of a deadlock. When the cluster 1 and the cluster 2 are coupled to each other through paths 1 and 2, each of the paths can be used in both the directions, but the direction to be used is limited to one of the directions in the storage control apparatus 1 according to one embodiment of this invention.

The deadlock may occur when the cluster 1 reads data in the memory 2 of the cluster 2, and, at the same time, the cluster 2 reads data in the memory 1 of the cluster 1. For example, when a read request 1 is transmitted from the cluster 1 to the cluster 2, a read request 2 is transmitted from the cluster 2 to the cluster 1, the cluster 1 is brought into a state of incapable of receiving other request/response until the cluster 1 transmits a read response 1 for the read request 1 to the cluster 2, and the cluster 2 is brought into a state of incapable of receiving other request/response until the cluster 2 transmits a read response 2 to the cluster 1, a state (deadlock) in which the wait states of the cluster 1 and the cluster 2 are not released occurs.

Figure 11:
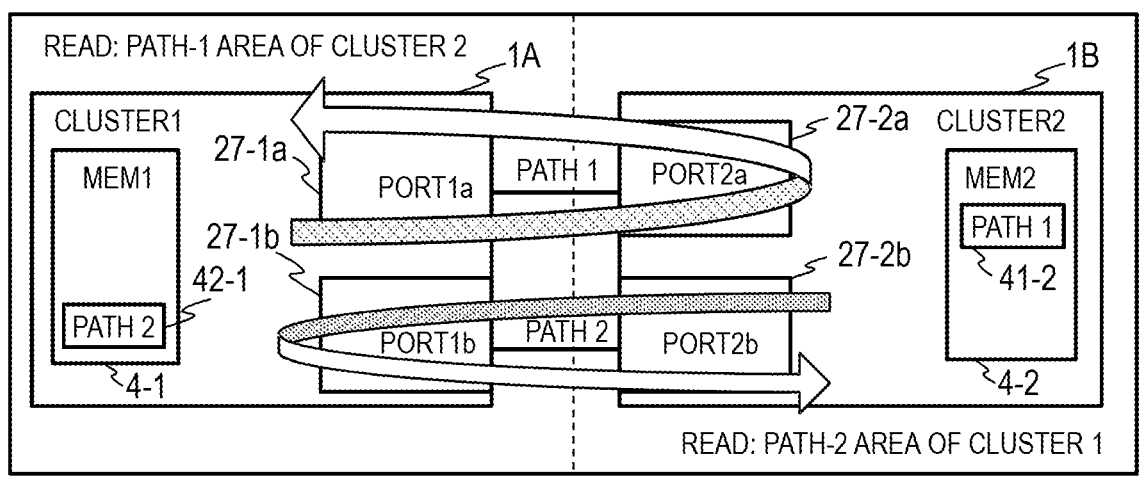
FIG. 11 is a diagram for illustrating avoidance of the deadlock according to the embodiment of this invention.

Thus, in the storage control apparatus 1 according to one embodiment of this invention, as illustrated in FIG. 11, each of the path 1 and the path 2 is used only in one direction for the read request.

FIG. 11 is a diagram for illustrating avoidance of the deadlock. In this embodiment, the path 1 for coupling the port 27-1a and the port 27-2a to each other is used by the cluster 1 for the processing of reading from the memory 4-2 of the cluster 2. Moreover, the path 2 for coupling the port 27-1b and the port 27-2b to each other is used by the cluster 2 for the processing of reading from the memory 4-1 of the cluster 1.

When the path 1 and the path 2 are used for the read processing, the read processing from the cluster 1 side is executed in the path 1, and the read processing from the cluster 2 side is executed in the path 2. In other words, the use of the path 2 is inhibited for the read processing from the cluster 1 side. The use of the path 1 is inhibited for the read processing from the cluster 2 side.

When the cluster 2 receives write data, a guarantee code is generated by the front-end interface 5-2, and is added to the write data, and the write data and the guarantee code are stored in the path-1 area 41-2. Then, the processor core 31-2 requests the CPU 3-1 of the cluster 1 for the activation of the DMA controller 32-1 in a manner similar to the description given above.

The DMA controller 32-1 reads the write data and the guarantee code from the path-1 area 41-2 of the cluster 2 through the path 1, and writes the data to the path-1 area 41-1 of the cluster 1 after the verification processing.

The DMA controller 32-2 of the cluster 2 executes the read processing in the path 2 and the path-2 area 42 as described above. As a result, the deadlock can be avoided by limiting each of the path 1 and path 2 to the read processing only in one direction in the processing of reading write data by the DMA controller 32 when the write data is redundantly configured.

In this way, as illustrated in FIG. 10A and FIG. 10B, in the redundant configuration in which both the cluster 1 and the cluster 2 execute the read processing, the above-mentioned deadlock can be avoided to stably operate the storage control apparatus 1 by fixing the direction of the read processing (the transfer direction of the data) in each of the two paths 1 and 2 for coupling the cluster 1 and the cluster 2 to each other to one direction.

CONCLUSION

As described above, in this embodiment, in the redundant configuration of adding a guarantee code to write data in the cluster 1, and transferring the guarantee code and the write data to the cluster 2, the time for the verification processing can be reduced by executing the hardware processing by the error check module 33 compared with the verification processing for the guarantee code through the software processing.

Further, although the wait time for securing the processor core 31-2 is required in the software processing by the processor core 31-2, the wait time for securing the computer resource for the software processing is eliminated through the hardware processing by the error check module 33.

The time during which the cluster 1 receives a write request, the write data is transferred to the cluster 2 for the redundant configuration, and the response is transmitted to the host 9 can be reduced, and thus the performance of the storage control apparatus 1 can be increased.

Moreover, in this embodiment, the read processing through the two paths 1 and 2 configured to couple the redundantly configured clusters 1 and 2 to each other is set as unidirectional so as to be capable of avoiding deadlock and increasing the reliability of the storage control apparatus 1.

In the above-mentioned embodiment, the example in which the error check module 33 is included in the DMA controller 32 is described, but the configuration is not limited to this example. It is only required that the guarantee code be verified during the DMA transfer, and the DMA controller 32 and the error check module 33 may thus be simultaneously provided in the CPU 3. In this case, it is only required that the write data and the guarantee code read by the DMA controller 32 be acquired by the error check module 33, and the data having the verified guarantee code is returned to the DMA controller 32.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A storage system having a redundant configuration, comprising:
    a storage apparatus comprising a storage medium;
    a first cluster; and
    a second cluster redundantly configured to and operating independently of the first cluster,
    the storage system being configured to control the storage apparatus,
    the first cluster and the second cluster being coupled to each other through a path,
    the first cluster comprising a first processor including a processor core and a first memory,
    the second cluster comprising a second processor including a processor core and a second memory,
    the second processor comprising:
        a DMA controller configured to transfer write data stored in the first memory to the second memory through the path; and
        an error check module configured to verify a certification code added to the write data,
    the first cluster being configured to, when receiving the write data directed to the storage apparatus, generate a guarantee code for the write data, add the guarantee code to the write data, store the write data and the guarantee code in a predetermined area of the first memory, and send to the second cluster a request for DMA transfer,
    the second cluster being configured to activate the DMA controller based on the request for DMA transfer, read the write data and the guarantee code from the first memory, control the error check module to verify the guarantee code, without use of the processor core of the second processor, and store the write data for which the guarantee code has been verified in the second memory.

2. The storage system according to claim 1, wherein the DMA controller comprises the error check module.

3. The storage system according to claim 1,
    wherein the first cluster further comprises a front-end module configured to receive the write data directed to the storage apparatus, and
    wherein the front-end module is configured to generate the guarantee code for the write data, add the guarantee code to the write data, and store the write data and the guarantee code in the first memory.

4. The storage system according to claim 1,
    wherein the second cluster is configured to notify the first cluster of completion of the DMA transfer and that the guarantee code has been verified, and
    wherein the first cluster is configured to transmit a response indicating write completion of the write data.

5. The storage system according to claim 1,
    wherein the path comprises a first path and a second path,
    wherein the first processor comprises a DMA controller,
    wherein the DMA controller of the first processor is configured to read write data from the second memory through the first path, and store the write data in the first memory, and
    wherein the DMA controller of the second processor is configured to read write data from the first memory through the second path, and store the write data in the second memory.

6. A storage control apparatus having a redundant configuration, comprising a first cluster and a second cluster,
    the first cluster and the second cluster being coupled to each other through a path,
    the first cluster comprising a first processor including a processor core and a first memory,
    the second cluster redundantly configured to and operating independently of the first cluster and comprising a second processor including a processor core and a second memory,
    the second processor comprising:
        a DMA controller configured to transfer write data stored in the first memory to the second memory through the path; and
        an error check module configured to verify a certification code added to the write data,
    the first cluster being configured to, when receiving the write data, generate a guarantee code for the write data, add the guarantee code to the write data, store the write data and the guarantee code in a predetermined area of the first memory, and request the second cluster for DMA transfer,
    the second cluster being configured to activate the DMA controller based on the request for DMA transfer, read the write data and the guarantee code from the first memory, control the error check module to verify the guarantee code, without use of the processor core of the second processor and store the write data for which the guarantee code has been verified in the second memory.

7. The storage control apparatus according to claim 6, wherein the DMA controller comprises the error check module.

8. The storage control apparatus according to claim 6,
    wherein the first cluster further comprises a front-end module configured to receive the write data, and
    wherein the front-end module is configured to generate the guarantee code for the write data, add the guarantee code to the write data, and store the write data and the guarantee code in the first memory.

9. The storage control apparatus according to claim 6,
    wherein the second cluster is configured to notify the first cluster of completion of the DMA transfer and that the guarantee code has been verified, and
    wherein the first cluster is configured to transmit a response indicating write completion of the write data.

10. The storage control apparatus according to claim 6,
    wherein the path comprises a first path and a second path,
    wherein the first processor comprises a DMA controller,
    wherein the DMA controller of the first processor is configured to read write data from the second memory through the first path, and store the write data in the first memory, and
    wherein the DMA controller of the second processor is configured to read write data from the first memory through the second path, and store the write data in the second memory.

* * * * *